United States Patent Office 3,499,907
Patented Mar. 10, 1970

3,499,907
2-IMINO-5-NITROTHIAZOLINE COMPOUNDS
Peter John Islip, Hampton, England, assignor to Parke, Davis & Company, Detroit, Mich., a corporation of Michigan
No Drawing. Filed Mar. 4, 1968, Ser. No. 709,923
Claims priority, application Great Britain, Mar. 6, 1967, 10,497/67
Int. Cl. C07d 91/26
U.S. Cl. 260—293.4         6 Claims

ABSTRACT OF THE DISCLOSURE 2-imino-5-nitrothiazolines, in which the 2-imino group is lower alkanoylimino, cycloalkylcarbonylimino, benzoylimino, lower alkoxycarbonylimino, or phenoxycarbonylimino, and the 3-position is substituted by an unsubstituted or a mono- or di-lower alkyl or benzyl-substituted carbamoylalkyl grouping, by a heterocyclic aminocarbonylalkyl grouping, or by a lower alkoxycarbonylalkyl grouping; and their production by reacting a 5-nitrothiazole compound, in which the 2-position is substituted by lower alkylcarboxamido, cycloalkylcarboxamido, benzamido, lower alkoxycarboxamido, or phenoxycarboxamido, and the 3-position is unsubstituted, with a suitably substituted α-haloacetamide or α-halopropionamide, or with an α-haloacetate ester or α-halopropionate ester, in the presence of a base that is preferably an alkali metal hydride. The products are useful schistosomacides and trichomonacides.

Summary and detailed description

The present invention relates to new thiazoline compounds that are useful as pharmacological agents and to methods for their production. More particularly, the invention relates to new 2-imino-5-nitrothiazoline compounds having the formula

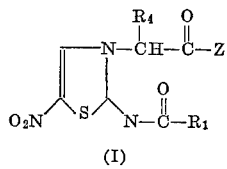

(I)

where $R_1$ is lower alkyl, cycloalkyl, phenyl, lower alkoxy, or phenoxy; $R_4$ is hydrogen or methyl; and Z represents a lower alkoxy group or an amino group having the formula

where $R_2$ is hydrogen or lower alkyl and $R_3$ is hydrogen, lower alkyl, or benzyl, or $R_2$ and $R_3$ are combined and together with the nitrogen atom to which they are attached represent a heterocyclic amino radical, such as pyrrolidino, piperidino, or morpholino. The lower alkyl groups in the foregoing formulas are those containing not more than six carbon atoms; the lower alkoxy groups are those containing not more than four carbon atoms; and the cycloalkyl groups are those having from three to six carbon atoms. A preferred lower alkoxy group is ethoxy, and a preferred cycloalkyl group is cyclopropyl.

In accordance with the invention, compounds having the foregoing formula are produced by reacting a 5-nitrothiazole compound having the formula

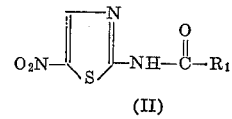

(II)

with an α-haloacetic acid derivative having the formula

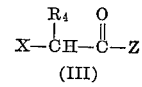

(III)

in the presence of a base, where $R_1$, $R_4$, and Z have the aforementioned significance, and X is chlorine, bromine or iodine, and, preferably, bromine. Bases that may be employed in this reaction include alkali metal hydrides, alkali metal amides, and alkali metal alkoxides. The preferred base is an alkali metal hydride, especially sodium hydride. The reaction is advantageously carried out in an unreactive solvent medium. With the preferred alkali metal hydride base, any of a number of anhydrous, non-hydroxylic solvents may be used, including ethers, such as diethyl ether, dioxane, and tetrahydrofuran; aromatic hydrocarbons, such as benzene and toluene; tertiary amides; such as dimethylformamide and N-methyl-2-pyrrolidone; and dimethyl sulfoxide; as well as mixtures of these. The preferred solvent is dimethylformamide. The temperature and duration of the reaction are not critical and may be varied over a wide range, the temperature from 0 to 100° C. and the duration from about 10 minutes to about 24 hours. In the preferred method for carrying out the reaction, a mixture of the 5-nitrothiazole compound of Formula II and the base is first prepared in the chosen solvent, the α-haloacetic acid derivative of Formula III is added, and the resulting reaction mixture is stirred for a period of from about 30 minutes to 3 hours at a temperature in the range of 15 to 50° C. Equimolar quantities of reactants and base are normally employed, although a slight excess of any one is not harmful. To insure completeness of reaction, it may be desirable to use a slight excess of both the α-haloacetic acid derivative and base.

The hitherto unknown α-haloacetic acid derivatives used as starting materials in the foregoing process can in general be prepared by reacting an α-haloacetyl halide compound having the formula

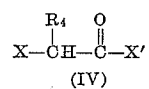

(IV)

with an amine compuond having the formula

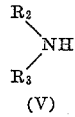

(V)

in an unreactive solvent medium, such as ethylene dichloride; where $R_2$, $R_3$, $R_4$, and X are as previously defined, and X' is chlorine or bromine.

The hitherto unknown 5-nitrothiazole starting materials can be prepared in a number of ways. For example, the N-(5-nitro-2-thiazolyl)cycloalkanecarboxamides, that is, the compounds of Formula II wherein $R_1$ is cycloalkyl, are prepared by reacting 2-amino-5-nitrothiazole in the presence of a base with the acid chloride of a cycloalkanecarboxylic acid that can be represented by the formula

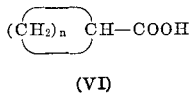

(VI)

where $n$ is 2, 3, 4, or 5. Another example, 5-nitro-2-thiazolecarbamic acid phenyl ester, the compound of Formula II wherein $R_1$ is phenoxy, is prepared by reacting 2-amino-5-nitrothiazole with phenyl chloroformate in pyridine.

The preparation of specific starting materials, employing the above reactions, is described in detail hereinafter.

The compounds of the invention are useful as pharmacological agents, especially as anti-parasitic agents that are active schistosomacides and trichomonacides. Their activities can be demonstrated and quantitatively measured in standard tests against *Schistosoma mansoni* and *Trichomonas vaginalis*.

In the test used to determine schistosomacidal activity, female Stout mice weighing 13–15 grams each are infected intraperitoneally with 75 *S. mansoni* (Puerto Rican strain) cercariae (from the snail host *Austrolarbis glabratus*) six weeks prior to treatment. The experimental groups usually consist of 5 to 10 mice, while the sham-dosed control groups number 10 to 15 mice per experiment. All of the mice are fed Rockland mouse food from the time of infection to autopsy. The test compounds are administered in the diet or by gavage. Following treatment for a measured period, the animals are killed and autopsied and the activity of the test compound is evaluated primarily on the basis of the distribution and number of living and dead worms in the liver, portal veins, and mesenteric veins. This activity is then expressed in terms of the percentage of schistosomes found killed after the period of treatment at a given dosage level, which is expressed either as a percentage of the diet or in mg./kg./day when administration is by gavage. The activities of some representative compounds of the present invention, as determined by this test procedure, are shown in the following table. The compounds in the table are identified by reference to the examples that follow, where the preparation of each is described.

SCHISTOSOMACIDAL ACTIVITY

| Compound | Percent Schistosomes Dead at % Mouse Diet for Number of Days | Percent Schistosomes Dead at Gavage Dose (mg./kg./day) for Number of Days |
| --- | --- | --- |
| Example 2 (a) | 92/0.0625/7 | 95/50/3 |
| Example 3 (b) | 100/0.25/14 | 93/200/5 |
| Example 3 (d) | 95/0.125/7 | 80/100/5 |
| Example 3 (k) | 91/0.125/7 | Not tested |
| Example 5 (a) | 65/0.25/14 | 70/200/5 |
| Example 2 (k) | 95/0.125/7 | 89/100/4 |

The test used to determine trichomonacidal activity is an in vitro test against *Trichomonas vaginalis*. In this test, Kupferberg's medium, containing 250 γ/ml. of sodium penicillin G and streptomycin sulfate, is inoculated with a sufficient number of organisms from a 24-hour Kupferberg culture to give 10,000 trichomonads/ml. The resulting mixture (4.5 ml.) is then added to 0.5 ml. of a solution or suspension of a measured quantity of the test compound in aqueous ethanol in screw-capped tubes, and the tubes are incubated at 37.0° C. for 48 hours. Varied concentrations of the test compound are obtained by serial dilution. After incubation, the effect of the test compound is determined by microscopic examination of 0.02 ml. of the test preparation dispersed under a 22 x 22 mm. coverslip. The number of viable trichomonads per Howard disc field is recorded, with at least 10 fields being counted. The test preparations are also compared with control tubes to which no test compound is added. The test compound is rated as follows, according to the percentage of suppression of the number of viable organisms: cidal—100%; static—90 to 99.9%; suppressive—50 to 89.9%; inactive—less than 50%. When tested by means of the foregoing procedure, the compound of Example 2a herein, 2-(acetylimino)-5-nitro-N,N-dipropyl-4-thiazoline-3-acetamide was rated as cidal at 6.25 γ/ml., static at 1.56 γ/ml., and inactive at 0.4 γ/ml.

The invention is illustrated by the following examples.

Example 1

To a stirred solution of 12.6 g. of 2-acetamido-5-nitrothiazole in 140 ml. of dimethylformamide is added in portions 3.2 g. of a 50% sodium hydride dispersion in mineral oil. 2-bromoacetamide (9.2 g.) is added next, and the resulting mixture is stirred at 20–25° C. for one hour and then diluted with 100 ml. of water. The solid 2-(acetylimino)-5-nitro-4-thiazoline-3-acetamide that precipitates is isolated, washed with water and with ether, and crystallized from 96% ethanol; M.P. 211–213° C.

In the foregoing procedure, the same product is obtained when 6.3 g. of 2-chloroacetamide is substituted for the 2-bromoacetamide.

Example 2

Utilizing the procedure described in Example 1 above, with the indicated variations in reaction time, the following 2-acylimino-5-nitro-4-thiazoline-3-acetamide compounds are obtained from the reaction of the designated reactants and base:

(a) 2 - (acetylimino) - 5 - nitro-N,N-dipropyl-4-thiazoline-3-acetamide, M.P. 127–128° C., following crystallization from 96% ethanol; from reaction of 12.6 g. of 2-acetamido-5-nitrothiazole, 3.2 g. of 50% sodium hydride in mineral oil dispersion, and 14.8 g. of 2-bromo-N,N-dipropylacetamide in 140 ml. of dimethylformamide for 90 minutes.

(b) N,N - diethyl-5-nitro-2-(propionylimino)-4-thiazoline-3-acetamide, M.P. 151–153° C. (from 96% ethanol); from reaction of 12.0 g. of 5-nitro-2-propionamidothiazole, 2.88 g. of 50% sodium hydride in mineral oil dispersion, and 11.64 g. of 2-bromo-N,N-diethylacetamide in 150 ml. of dimethylformamide for 2 hours.

(c) 2 - (acetylimino)-N,N-diethyl-5-nitro-4-thiazoline-3-acetamide, M.P. 140–141° C. (from 96% ethanol); from reaction of 12.6 g. of 2-acetamido-5-nitrothiazole, 3.2 g. of 50% sodium hydride in mineral oil dispersion, and 13.6 g. of 2-bromo-N,N-diethylacetamide in 140 ml. of dimethylformamide for 90 minutes.

(d) N,N - dibutyl-5-nitro-2-(propionylimino)-4-thiazoline-3-acetamide, M.P. 97–98° C. (from 96% ethanol); from reaction of 13.3 g. of 5-nitro-2-propionamidothiazole, 3.2 g. of 50% sodium hydride in mineral oil dispersion, and 16.6 g. of 2-bromo-N,N-dibutylacetamide in 150 ml. of dimethylformamide for 90 minutes.

(e) 2-(acetylimino)-N-benzyl-5-nitro - 4 - thiazoline-3-acetamide, M.P. 189–190° C. (from 96% ethanol); from reaction of 12.6 g. of 2-acetamido-5-nitrothiazole, 3.2 g. of 50% sodium hydride in mineral oil dispersion, and 15.3 g. of N-benzyl-2-bromoacetamide in 140 ml. of dimethylformamide for 30 minutes.

(f) N - benzyl-5-nitro-2-(propionylimino)-4-thiazoline-3-acetamide, M.P. 197–199° C. (from 96% ethanol); from reaction of 6.4 g. of 5-nitro-2-propionamidothiazole, 1.52 g. of 50% sodium hydride in mineral oil dispersion, and 7.2 g. of N-benzyl-2-bromoacetamide in 100 ml. of dimethylformamide for 2 hours.

(g) 5 - nitro-2-(propionylimino)-N-propyl-4-thiazoline-3-acetamide, M.P. 186–187° C. from 96% ethanol); from reaction of 10 g. 5-nitro-propionamidothiazole, 2.4 g. of 50% sodium hydride in mineral oil dispersion, and 9.0 g. of 2-bromo-N-propylacetamide in 90 ml. of dimethylformamide for 2 hours.

(h) 2 - (acetylimino)-N-methyl-5-nitro-4-thiazoline-3-acetamide, M.P. 206–207° C. (from 96% ethanol); from reaction of 12.6 g. of 2-acetamido-5-nitrothiazole, 3.2 g. of 50% sodium hydride in mineral oil dispersion, and 10.3 g. of 2-bromo-N-methylacetamide in 140 ml. of dimethylformamide for 2 hours.

(i) 2 - (acetylimino)-N,N-dimethyl-5-nitro-4-thiazoline-3-acetamide, M.P. 137–139° C. (from 96% ethanol); from reaction of 12.6 g. of 2-acetamido-5-nitrothiazole, 3.2 g. of 50% sodium hydride in mineral oil dispersion, and 11.2 g. of 2-bromo-N,N-dimethylacetamide in 140 ml. of dimethylformamide for 2 hours.

(j) N - {5-nitro-3-[(1-pyrrolidinylcarbonyl)methyl]-4-thiazolin-2-ylidene}acetamide, M.P. 161—163° C. (from 96% ethanol); from reaction of 5.95 g. of 2-acetamido-5-nitrothiazole; 1.54 g. of 50% of sodium hydride in mineral oil dispersion, and 4.7 g. of N-(chloroacetyl)pyrrolidine in 40 ml. of dimethylformamide at 60° C. for 2–3 hours.

(a) N,N-dimethyl-5-nitro-2-(propionylimino) - 4 - thiathiazolin-2-ylidene}acetamide, M.P. 165–166° C. (from 96% ethanol); from reaction of 18.7 g. of 2-acetamido-5-nitrothiazole, 5.1 g. of 50% sodium hydride in mineral oil dispersion, and 20.0 g. of N-(chloroacetyl)piperidine in 150 ml. of dimethylformamide at 60° C. for 3 hours.

Example 3

Utilizing the procedure described in Example 1 above, with the indicated variations, the following 2-imino-5-nitrothiazoline compounds are obtained from the reaction of the designated reactants. The base in each case is 50% sodium hydride in mineral oil dispersion, and the solvent is dimethylformamide. The amount of water required to precipitate the product will vary somewhat in each case; an amount sufficient to insure complete precipitation is used.

(a) N,N - dimethyl-5-nitro-2-(propionylimino)-4-thiazoline-3-acetamide, M.P. 163–164° C., following crystallization from 96% ethanol; from reaction of 15.1 g. of 5-nitro-2-propionamidothiazole, 3.8 g. of base, and 12.45 g. of 2-bromo-N,N-dimethylacetamide in 120 ml. of solvent for 3 hours.

(b) 2 - (benzoylimino - 5 - nitro-4-thiazoline-3-acetamide, M.P. 264–266° C., with decomposition (from acetic acid); from reaction of 12.45 g. of 2-benzamido-5-nitrothiazole, 2.4 g. of base, and 4.7 g. chloroacetamide in 110 ml. of solvent for 4 hours at 95° C.

(c) 2-(benzoylimino)-N,N-diethyl-5-nitro-4-thiazoline-3-acetamide, M.P. 207–209° C. (from acetic acid); from reaction of 24.9 g. of 2-benzamido-5-nitrothiazole, 4.8 g. of base, and 15.0 g. of 2-chloro-N,N-diethyl-acetamide in 120 ml. of solvent for 2 hours at 120° C.

(d) 2 - [(cyclopropylcarbonyl)imino]-N,N-dimethyl-5-nitro-4-thiazoline-3-acetamide, M.P. 172–174° C. (from ethyl acetate); from reaction of 4.3 g. of N-(5-nitro-2-thiazolyl)cyclopropanecarboxamide, 0.97 g. of base, and 4.3 g. of 2-bromo-N,N-dimethylacetamide in 40 ml. of solvent for 2 hours.

The starting material is prepared as follows: With stirring and external cooling to maintain the temperature at 3–7° C., a solution of 12.5 g. of cyclopropanecarbonyl chloride in 50 ml. of acetone is added over a period of 15 minutes to a solution of 14.5 g. of 2-amino-5-nitrothiazole and 9.7 ml. of pyridine in 70 ml. of dimethylformamide. The resulting mixture is allowed to warm to room temperature over a period of one hour and is then poured into 1.5 liters of ice water. The insoluble product is collected on a filter, washed with water, and dried. It is N-(5-nitro-2-thiazolyl)cyclopropanecarboxamide; M.P. 235–237.5° C., following crystallization from ethyl acetate-isooctane.

(e) 2 - [(cyclopropylcarbonyl)imino] - N,N - diethyl-5-nitro-4-thiazoline-3-acetamide, M.P. 156–158° C. (from ethyl acetate); from reaction of 5.0 g. N-(5-nitro-2-thiazolyl)cyclopropanecarboxamide, 1.13 g. of base, and 4.8 g. of 2-bromo-N,N-diethylacetamide in 50 ml. of solvent for 30 minutes at 20–25° C. and 30 minutes at 40° C.

In a similar manner, with the substitution of 5.2 g. of N-(5-nitro-2-thiazolyl)cyclobutanecarboxamide for the N-(5-nitro-2-thiazolyl)cyclopropanecarboxamide, there is obtained 2 - [(cyclobutylcarbonyl)imino]-N,N-diethyl-5-nitro-4-thiazoline-3-acetamide.

The N - (5 - nitro - 2 - thiazolyl)cyclobutanecarboxamide starting material, M.P. 200–203° C., is prepared by the procedure described in (d) above, substituting cyclobutanecarbonyl chloride for the cyclopropanecarbonyl chloride.

(f) N,N - dibutyl - 2 - [(cyclopropylcarbonyl) - imino]-5-nitro-4-thiazoline-3-acetamide, M.P. 103–105° C. (from ethyl acetate); from reaction of 5.0 g. N-(5-nitro-2-thiazolyl)cyclopropanecarboxamide, 1.13 g. of base, and 7.0 g. of 2-bromo-N,N-dibutylacetamide in 50 ml. of solvent for 30 minutes at 20–25° C. and 30 minutes at 40° C.

In a similar manner, with the substitution of 5.9 g. of N - (5 - nitro - 2 - thiazolyl)cyclohexanecarboxamide for the N - (5 - nitro - 2 - thiazolyl)cyclopropanecarboxamide, there is obtained N,N-dibutyl-2-[(cyclohexylcarbonyl)-imino]-5-nitro-4-thiazoline-3-acetamide.

(g) 3 - (carbamoylmethyl) - 5 - nitro - 4 - thiazoline-$\Delta^{2,N}$-carbamic acid, ethyl ester, M.P. 218–218.5° C. (from 96% ethanol); from reaction of 10.85 g. of 5-nitro-2-thiazolecarbamic acid, ethyl ester, 2.4 g. of base, and 6.9 g. of 2-bromoacetamide in 60 ml. of solvent for 2 hours at 20–25° C.

In a similar manner, with the substitution of 10 g. of 5-nitro-2-thiazolecarbamic acid, methyl ester, for the ethyl ester, there is obtained 3-(carbamoylmethyl)-5-nitro-4-thiazoline-$\Delta^{2,N}$-carbamic acid, methyl ester.

(h) 3 - [(diethylcarbamoyl)methyl] - 5 - nitro - 4 - thiazoline-$\Delta^{2,N}$-carbamic acid, ethyl ester, M.P. 132–134° C. (from 96% ethanol); from reaction of 10.85 g. of 5-nitro-2-thiazolecarbamic acid, ethyl ester, 2.4 g. of base, and 10.0 g. of 2-bromo-N,N-diethylacetamide in 60 ml. of solvent for 2 hours at 20–25° C.

(i) 3 - [(dibutylcarbamoyl)methyl] - 5 - nitro - 4 - thiazoline-$\Delta^{2,N}$-carbamic acid, ethyl ester, M.P. 130–132° C. (from 96% ethanol); from reaction of 10.85 g. of 5-nitro-2-thiazolecarbamic acid, ethyl ester, 2.4 g. of base, and 12.5 g. of 2-bromo-N,N-dibutylacetamide in 60 ml. of solvent for 2 hours at 20–25° C.

(j) 3 - [(dipropylcarbamoyl)methyl] - 5 - nitro - 4-thiazoline-$\Delta^{2,N}$-carbamic acid, ethyl ester, M.P. 137–139° C. (from 96% ethanol); from reaction of 10.85 g. of 5-nitro-2-thiazolecarbamic acid, ethyl ester, 2.4 g. of base, and 11.1 g. of 2-bromo-N,N-dipropylacetamide in 60 ml. of solvent for 2 hours at 20–25° C.

(k) 3 - [(dimethylcarbamoyl)methyl] - 5 - nitro - 4-thiazoline-$\Delta^{2,N}$-carbamic acid, ethyl ester, M.P. 135–137° C. (from 96% ethanol); from reaction of 10.85 g. of 5-nitro-2-thiazolecarbamic acid, ethyl ester, 2.4 g. of base, and 8.3 g. of 2-bromo-N,N-dimethylacetamide in 60 ml. of solvent for 2 hours at 20–25° C.

(l) 3 - [(methylcarbamoyl)methyl] - 5 - nitro - 4 - thiazoline-$\Delta^{2,N}$-carbamic acid, ethyl ester, M.P. 215–217° C. (from 96% ethanol); from reaction of 10.85 g. of 5-nitro-2-thiazolecarbamic acid, ethyl ester, 2.4 g. of base, and 7.6 g. of 2-bromo-N-methylacetamide in 60 ml. of solvent for 2 hours at 20–25° C.

(m) 3 - [(dimethylcarbamoyl)methyl] - 5 - nitro - 4-thiazoline-$\Delta^{2N}$-carbamic acid, phenyl ester, M.P. 169–172° C. (from 96% ethanol); from reaction of 10.0 g. of 5-nitro-2-thiazolecarbamic acid, phenyl ester, 1.81 g. of base, and 6.3 g. of 2-bromo-N,N-dimethylacetamide in 60 ml. of solvent for 2 hours at 20–25° C.

The starting material is prepared as follows. With stirring and external cooling to maintain the reaction temperature below 50° C., 51.8 g. of phenyl chloroformate is added to a suspension of 48 g. of 2-amino-5-nitrothiazole in 200 ml. of pyridine, the mixture is stirred at 20–25° C. for 4 hours, and is kept at room temperature overnight. The precipitated solid product is isolated, washed with water, with 2 N hydrochloric acid, and with water again, and dried under reduced pressure. It is the desired 5-nitro-2-thiazolecarbamic acid, phenyl ester, M.P. 254–255° C. (with decomposition), following crystallization from benzene-dimethylformamide.

(n) N - {3 - [(morpholinocarbonyl)methyl] - 5 - nitro-4-thiazolin-2-ylidene}acetamide, M.P. 175–176° C. (from 96% ethanol); from reaction of 18.7 g. of 2-acetamido-5-nitrothiazole, 5.1 g. of base, and 23 g. of N-(chloroacetyl)morpholine in 150 ml. of solvent at 60° C. for 2–3 hours.

(o) N - {5 - nitro - 3 - [(1 - pyrrolidinylcarbonyl)-methyl]-4-thiazolin-2-ylidene}propionamide, M.P. 146–147° C. (from 96% ethanol); from reaction of 20.1 g. of 5-nitro-2-propionamidothiazole, 5.0 g. of base, and 14.8 g. of N-(chloroacetyl)pyrrolidine in 150 ml. of solvent at 60° C. for 2–3 hours.

(p) N - {5 - nitro - 3 -[(piperidinocarbonyl)methyl]-4-thiazolin-2-ylidene}propionamide, M.P. 159–160° C. (from 96% ethanol); from reaction of 10.0 g. of 5-nitro-2-propionamidothiazole, 2.5 g. of base, and 16.0 g. of N-(chloroacetyl)piperidine in 80 ml. of solvent at 60° C. for 2–3 hours.

(q) N - {3 - [(morpholinocarbonyl)methyl] - 5 - nitro-4 - thiazolin-2-ylidene}propionamide, M.P. 126–127° C. (from 96% ethanol); from reaction of 20.1 g. of 5-nitro-2-propionamidothiazole, 5.0 g. of base, and 23 g. of N-(chloroacetyl)-morpholine in 150 ml. of solvent at 60° C. for 2–3 hours.

Example 4

To a stirred solution of 18.7 g. of 2-acetamido-5-nitrothiazole in 150 ml. of dimethylformamide is added in portions 5.0 g. of a 50% sodium hydride dispersion in mineral oil, followed by 15.2 g. of 2-bromopropionamide, and the resulting mixture is stirred at 20–25° C. for about 3 hours or until it is neutral. After dilution with a small amount of water, the aqueous mixture is filtered to remove unreacted starting material, and the filtrate is extracted several times with ethyl acetate. The combined extracts are washed with water, dried, and evaporated to give an oil that is washed with light petroleum ether (B.P. 60–80° C.) and with ether to give the solid product, 2-(acetylimino) - α - methyl - 5 - nitro - 4 - thiazoline - 3-acetamide; M.P. 225° C. (with decomposition), following crystallization from 96% ethanol.

Example 5

(a) To a stirred solution of 18.7 g. of 2-acetamido-5-nitrothiazole in 140 ml. of dimethylformamide is added in portions 4.8 g. of a 50% sodium hydride dispersion in mineral oil, followed by 16.7 g. of ethyl bromoacetate, and the resulting mixture is stirred at 20–25° C. for about 30 minutes. The solid obtained upon dilution of the reaction mixture with water is dried and stirred well with ether, and the ethereal phase, containing unwanted by-product resulting from alkylation of the 2-acetamido group, is discarded. The ether-insoluble solid is stirred with ethyl acetate, the resulting mixture is filtered to remove unreacted starting material, and the filtrate is evaporated to give the desired product, 2-(acetylamino)-5-nitro-4-thiazoline-3-acetic acid, ethyl ester; M.P. 159–160° C., following crystallization from 96% ethanol.

(b) From reaction of 10.0 g. of N-(5-nitro-2-thiazolyl) g. of methyl bromoacetate for the ethyl bromoacetate in the foregoing procedure, there is obtained 2-(acetylimino)-5-nitro-4-thiazoline-3-acetic acid, methyl ester.

(c) Also similarly, with the substitution of 18.1 g. of ethyl 2-bromopropionate for the ethyl bromoacetate in the foregoing procedure, there can be obtained 2-(acetylimino)-α-methyl-5-nitro-4-thiazoline-3-acetic acid, ethyl ester.

Example 6

Utilizing the procedure described in Example 5 above, with minor variations in time, temperature, and isolation technique, the following 2-imino-5-nitrothiazoline compounds are obtained from the reaction of the designated reactants in dimethylformamide employing 50% sodium hydride in mineral oil dispersion as base.

(a) From reaction of 20.1 g. of 5-nitro-2-propionamidothiazole and 16.7 g. of ethyl bromoacetate there is obtained 5-nitro-2-(propionylimino)-4-thiazoline-3-acetic acid, ethyl ester; M.P. 145–146° C. (from 96% ethanol).

(b) From reaction of 10.0 g. of N-(5-nitro-2-thiazolyl)cyclopropanecarboxamide and 7.9 g. of ethyl bromoacetate there is obtained 2-[(cyclopropylcarbonyl)imino]-5-nitro-4-thiazoline-3-acetic acid, ethyl ester; M.P. 110–112° C. (from 96% ethanol).

(c) From reaction of 8.9 g. of 5-nitro-2-thiazolecarbamic acid, phenyl ester and 5.8 g. of ethyl bromoacetate there is obtained 2-(carboxyimino)-5-nitro-4-thiazoline-3-acetic acid, ethyl N-phenyl ester; M.P. 129–131° C. (from 96% ethanol).

(d) From reaction of 9.91- g. of 5-nitro-2-thiazolecarbamic acid, ethyl ester and 6.05 ml. of ethyl bromoacetate there is obtained 2-(carboxyimino)-5-nitro-4-thiazoline-3-acetic acid, diethyl ester. The product in this case is isolated as follows. The reaction mixture is evaporated, the oily residue is stirred with ethyl acetate, and the solution obtained is washed successively with 2 N hydrochloric acid, with water, with 2 N aqueous sodium bicarbonate, and with water again, and is then dried and evaporated. The residue is triturated with diethyl ether to give the desired solid product, which is isolated and crystallized from 96% ethanol; M.P. 126–127° C.

I claim:

1. A 2-imino-5-nitrothiazoline compound having the formula

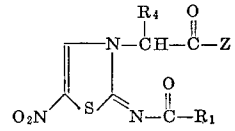

where $R_1$ is a member of the class consisting of lower alkyl, cycloalkyl of three to six carbon atoms, phenyl, lower alkoxy, and phenoxy; $R_4$ is a member of the class consisting of hydrogen and methyl; and Z represents a member of the class consisting of a lower alkoxy group and an amino group having the formula

where $R_2$ is a member of the class consisting of hydrogen and lower alkyl, and $R_3$ is a member of the class consisting of hydrogen, lower alkyl, and benzyl, and further members wherein $R_2$ and $R_3$ are combined and together with the nitrogen atom to which they are attached represent pyrrolidino, piperidino, or morpholino.

2. A compound according to claim 1 which is 2-(acetylimino) - 5 - nitro - N,N - dipropyl - 4 - thiazoline - 3-acetamide.

3. A compound according to claim 1 which is N,N- diethyl - 5 - nitro - 2 - (propionylimino) - 4 - thiazoline - 3-acetamide.

4. A compound according to claim 1 which is 2-(benzoylimino) - N,N - diethyl - 5 - nitro - 4 - thiazoline - 3-acetamide.

5. A compound according to claim 1 which is 3-[(dimethylcarbamoyl)methyl] - 5 - nitro - 4 - thiazoline-$\Delta^{2,N}$-carbamic acid, ethyl ester.

6. A compound according to claim 1 which is N-{5-nitro - 3 - [(piperidinocarbonyl)methyl] - 4 - thiazolin-2-ylidene}acetamide.

References Cited

UNITED STATES PATENTS 3,311,614  3/1967  Caffs _____ 260—293.45

HENRY R. JILES, Primary Examiner

S. D. WINTERS, Assistant Examiner

U.S. Cl. X.R.

260—247.1, 247.7, 294.7, 306.7, 306.8, 326.5, 487, 561, 562; 424—248, 267, 270